Patented Oct. 15, 1946

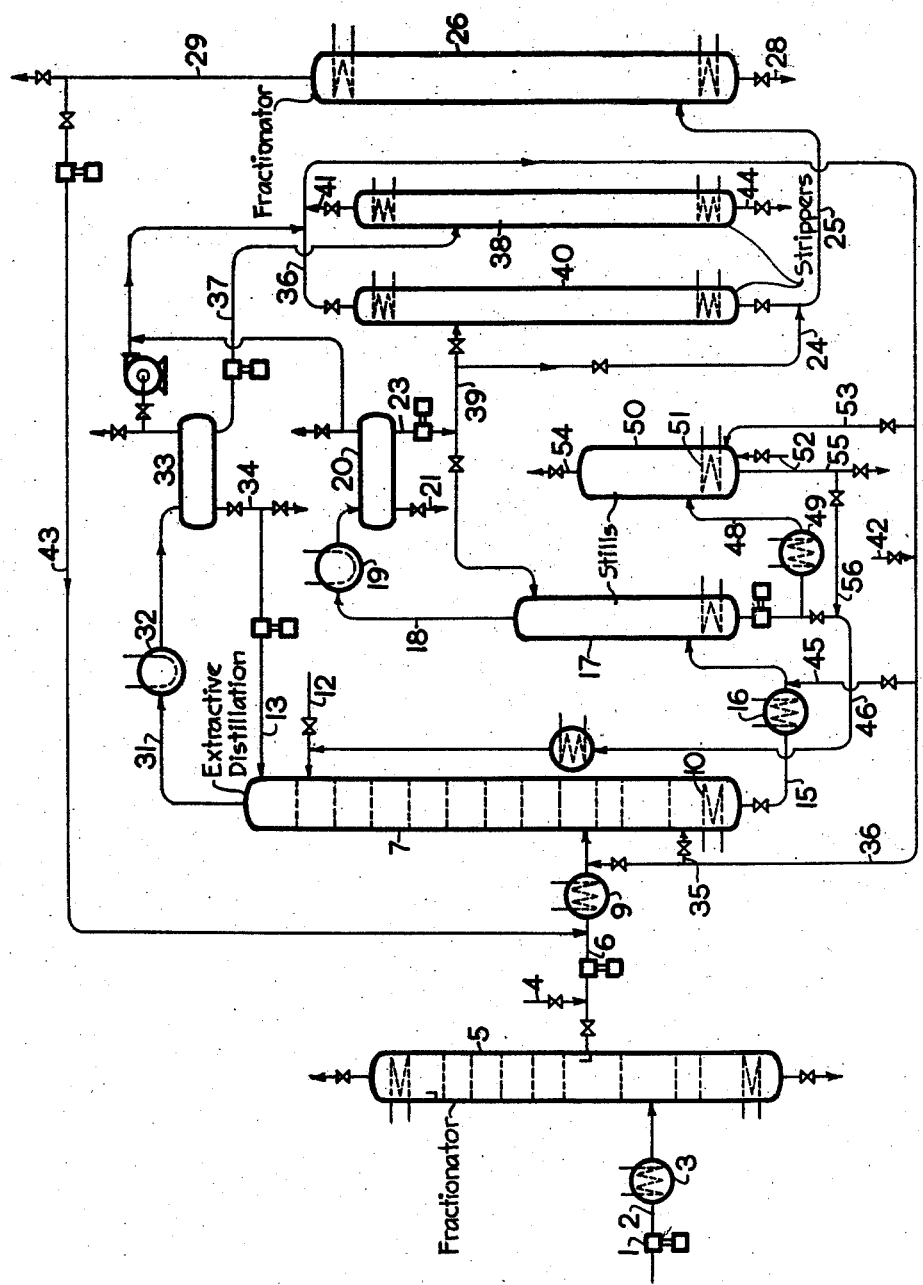

2,409,390

UNITED STATES PATENT OFFICE 2,409,390

PROCESS FOR SIMULTANEOUSLY ISOMERIZING AND SEPARATING CYCLOPARAFFINS FROM ACYCLIC PARAFFINS BY MEANS OF AN ALUMINUM HALIDE-HYDROCARBON COMPLEX

William E. Ross, Berkeley, and Philip Pezzaglia, Oakland, Calif., assignors to Shell Development Company, San Francisco, Calif.

Application December 4, 1944, Serial No. 566,538

10 Claims. (Cl. 260—666)

This invention relates to an improved process for the separation of cycloparaffins from hydrocarbon mixtures comprising cycloparaffins in admixture with open chain paraffins. The invention relates more particularly to an improved process for the production of cycloparaffins of hydroaromatic structure from hydrocarbon mixtures comprising open chain paraffins and cycloparaffins of non-hydroaromatic structure.

The cycloparaffins have become of exceeding importance as starting materials and intermediates in the production of a wide variety of organic products. The most fertile source of these highly desirable materials resides in the hydrocarbon mixtures obtained in the natural state as petroleum, and in the products obtained in the thermal or catalytic treatment of petroleum or distillate fractions thereof, and in the thermal or catalytic treatment such as, for example, hydrogenation of carbonaceous materials, etc. As is well known, the cycloparaffins in these readily available hydrocarbon mixtures are found therein in admixture with open chain paraffins. Realization of the full advantages inherent in the many chemical processes relying upon the cycloparaffins as starting or intermediate materials has heretofore been seriously handicapped by the lack of a process enabling the efficient separation on a practical scale of the cycloparaffins from the open chain paraffins in admixture with which they are generally encountered. Thus, separation of the cycloparaffins from open chain paraffins having the same, or approximately the same number of carbon atoms to the molecule, by such methods as fractional distillation if at all possible is often rendered so complex and delicate an operation as to render it highly impractical.

Of the cycloparaffins, those of hydroaromatic structure are of particular value and find application in the production of an exceedingly wide range of valuable organic products. The production of cycloparaffins of hydroaromatic structure in a state of required purity is rendered even more difficult since, to the difficulty of their separation from open chain paraffins is added the often equally vexing problem of their separation from isomeric non-hydroaromatic cycloparaffins and other hydrocarbons of close boiling range or capable of forming azeotropes therewith. By the term "hydroaromatic cycloparaffins" as used throughout this specification and appended claims is meant the cycloparaffins having a hexamethylene ring such as, for example, cyclohexane and the alkyl cyclohexanes, to distinguish them from cycloparaffins of non-hydroaromatic structure comprising those having pentamethylene rings such as, for example, methylcyclopentane and the alkyl cyclopentanes.

It has been suggested heretofore to subject the hydrocarbon mixtures comprising open chain paraffins and cycloparaffins of non-hydroaromatic structure to isomerizing conditions effecting the conversion of non-hydroaromatic cycloparaffins to hydroaromatic cycloparaffins and thereafter subject the entire hydrocarbon mixture to fractionation to separate fractions comprising desired cycloparaffins. Although such a procedure enables the production on a practical scale of certain of the naphthenic hydrocarbons such as, for example, cyclohexane in relatively concentrated form it still does not enable the attainment of desirable yields in even such specific instances. Thus, in the production of cyclohexane from hydrocarbon mixtures such as naphthenic gasolines as resorted to heretofore, the gasoline is generally first fractionated to separate a methylcyclopentane fraction, thus leaving the greater portion of cyclohexane and also a considerable amount of methylcyclopentane in a higher boiling fraction. Separation of such cyclohexane from the higher boiling hydrocarbon fraction by means such as simple distillation is highly impractical due to the presence therein of hydrocarbons such as, for example, dimethylpentanes boiling in the same range as cyclohexane. Subjection of the methylcyclopentane fraction to isomerizing conditions under the conditions resorted to heretofore generally does not enable the attainment of a high conversion approaching equilibrium conversion of methylcyclopentane to cyclohexane. Resort to the use of higher contact times though resulting in higher conversion generally does not occasion a corresponding increase in the quantity of cyclohexane recovered due to a greater increase in the rate of undesirable side reactions resulting in the conversion of both methylcyclopentane and cyclohexane to a higher boiling product. After such an isomerization operation the highly vexing problem of separating the naphthenic hydrocarbons from other hydrocarbons of close boiling range admixed therewith remains. Thus, separation from the cyclohexane produced of the close boiling hydrocarbons such as dimethylpentanes, generally encountered therewith, by methods utilized heretofore is highly impractical. A further difficulty inherent in these processes is due to the fact that in the isomerization of hydrocarbon mixtures generally available comprising both normal hexane and methylcyclopentane the proportion of methylcyclopentane initially present which is converted to cyclohexane exceeds the proportion of normal hexane converted to isohexane, thereby resulting in a progressive increase of normal hexane concentration in the unconverted portion of the charge recycled to the reaction zone to further complicate the separation problems encountered. It is thus clearly apparent that the advantages inherent in such processes as available heretofore in even such specific cases are limited.

Separation of cycloparaffins having more than six carbon atoms to the molecule from the highly complex hydrocarbon mixtures in which they are encountered presents even greater difficulties. In these cases the problems encountered in attempting to effect substantial separation of the cycloparaffins are in no wise overcome by first isomerizing the hydrocarbon mixture as a whole under isomerizing conditions resorted to heretofore. Such methods do not provide a practical answer, for example, to the production of hydrocarbons predominating in methylcyclohexane from the readily available hydrocarbon mixtures comprising the non-hydroaromatic cycloparaffins having seven carbon atoms to the molecule in admixture with open chain paraffins having seven and eight atoms to the molecule and having the same boiling range.

In its broadest aspect the object of the present invention is to provide an improved process enabling the more efficient separation of cycloparaffins from hydrocarbon mixtures comprising cycloparaffins and open chain paraffins.

A more particular object of the invention is the provision of a process enabling the more efficient separation of cycloparaffins from hydrocarbon mixtures comprising cycloparaffins and open chain paraffins under isomerizing conditions.

Another object of the invention is the provision of a process enabling the more efficient separation of cycloparaffins from hydrocarbon fractions comprising cycloparaffins and open chain paraffins having substantially the same number of carbon atoms to the molecule.

Another object of the invention is the provision of an improved process enabling the more efficient separation of cycloparaffins of non-hydroaromatic structure from hydrocarbon mixtures comprising cycloparaffins and open chain paraffins with simultaneous conversion during the separation of non-hydroaromatic cycloparaffins to hydroaromatic cycloparaffins.

A further object of the invention is the provision of an improved process for the more efficient production of hydrocarbons predominating in cyclohexane from hydrocarbon fractions comprising open chain hexanes and methylcyclopentane.

Still another object of the invention is the provision of an improved process for the more efficient production of methylcyclohexane from hydrocarbon fractions comprising open chain paraffins and cycloparaffins of non-hydroaromatic structure having seven carbon atoms to the molecule. Other objects and advantages of the invention will become apparent from the following description thereof.

It is known that unsaturated hydrocarbons, such as olefins and aromatic hydrocarbons, which react readily with aluminum chloride are removed from hydrocarbon mixtures containing them by treatment with aluminum chloride. In copending application, Serial Number 538,192, filed May 31, 1944, now Patent 2,382,445, of which the present application is a continuation-in-part, it has been shown that saturated hydrocarbons of cyclic structure comprising the cycloparaffins can be separated efficiently by liquid phase extraction under suitable conditions with a preformed complex obtained by the interaction of a metal halide of the Friedel-Crafts type and an organic compound. Though such liquid phase extraction results in substantial improvement in the production of cycloparaffins and particularly the cycloparaffins of hydroaromatic structure, these processes also suffer from an inability to attain conversion equal to or approximating equilibrium conversions of cycloparaffins of non-hydroaromatic structure to cycloparaffins of hydroaromatic structure when effecting the separation process under isomerizing conditions. Increasing the time of contact between solvent and hydrocarbons essential to the attainment of higher conversion rates results, as shown above, in the loss of a substantial amount of cycloparaffins due to the increase in reaction rates of side reactions converting cycloparaffins to higher boiling materials.

It has now been found that separation of cycloparaffins from paraffinic hydrocarbons admixed therewith is effected with even greater efficiency by distilling the cycloparaffin-containing hydrocarbon mixture in the presence of a countercurrent stream of preformed organo-metal halide complex. By maintaining suitable isomerization conditions in the extractive distillation zone the cycloparaffins of non-hydroaromatic structure present in the hydrocarbon mixture are converted to cycloparaffins of hydroaromatic structure during the cycloparaffin separation. Separation of the cycloparaffins from hydrocarbon mixtures comprising them by means of extractive distillation under hydrocarbon isomerizing conditions in accordance with the process of the invention enables the attainment of substantially equilibrium conversions of cycloparaffins of non-hydroaromatic structure to cycloparaffins of hydroaromatic structure in the absence of any substantial loss of cycloparaffins due to their conversion to higher boiling products, thereby providing signal advantages over the liquid phase extraction method as well as over other processes available heretofore for the production of cycloparaffins of hydroaromatic structure.

In accordance with the process of the invention, the hydrocarbon charge comprising a mixture of cycloparaffins and open chain paraffins such as, for example, a naphthenic straight run gasoline fraction optionally predominating in hydrocarbons having substantially the same number of carbon atoms to the molecule, such as a hexane or heptane fraction, is introduced into a distillation zone comprising, for example, a fractional distillation column. Into the upper part of the column there is introduced a preformed organo-metal halide complex obtained by the interaction of a metal halide of the Friedel-Crafts type and an organic compound, resulting in the contacting of the upwardly rising hydrocarbon vapors with a descending stream comprising hydrocarbon reflux and organo-metal halide complex. The ratio of the organo-metal halide solvent introduced into the column to the hydrocarbon charge is maintained sufficiently high to assure a homogeneous liquid phase in equilibrium with the vapor. Conditions within the column are controlled to result in the production of overhead vapors comprising paraffinic hydrocarbons and a liquid bottom product comprising organo-metal halide complex and cycloparaffins. Bottoms from the extractive distillation zone are passed to a solvent separating zone wherein hydrocarbons comprising the cycloparaffins are separated from the organo-metal halide solvent. The cycloparaffins eliminated from the complex separating zone are introduced into a product separating zone wherein separation of cycloparaffins into fractions predominating in cycloparaffins of particular composition is effected.

The vapor overhead from the extractive distillation column, comprising the paraffinic hydrocarbons, is passed through a condensing zone into an accumulating zone. A portion of the condensate is taken from the accumulating zone and passed as reflux to the distillation zone.

By maintaining suitable cycloparaffin isomerizing conditions within the extractive distillation zone, comprising the introduction of a hydrogen halide or a material affording a hydrogen halide into the extractive distillation zone, and the maintenance therein of conditions defined more fully below, the isomerization of cycloparaffins such as, for example, the conversion of cycloparffins of non-hydroaromatic structure to cycloparaffins of hydroaromatic structure is accomplished simultaneously with the extractive distillation operation.

When the extractive distillation zone is thus maintained under cycloparaffin isomerizing conditions, vapor overhead eliminated therefrom and the hydrocarbons comprising cycloparaffins eliminated from the organo-metal halide complex solvent separating zone are passed in separate streams to independent stripping zones wherein the hydrogen halide promoter admixed therewith is separated as gaseous fractions. The gaseous fractions comprising the hydrogen halide are recycled to the extractive distillation zone.

In order to set forth more clearly the nature of the invention it will be described herein in detail with reference to the attached drawing in which the single figure represents a more or less diagrammatic elevational view of one form of apparatus suitable for executing the process of the invention.

A hydrocarbon mixture of relatively wide boiling range comprising cycloparaffins and open chain paraffins such as, for example, a naphthenic gasoline is forced by means of pump 1 through line 2 into a feed fractionating zone. Suitable heating means such as, for example, a hydrocarbon fluid heater or indirect heat exchanger 3 is positioned in line 2. The feed fractionating zone is depicted in the drawing by a single fractionator 5 for the purpose of simplicity. It will be understood that in actual practice more than one such fractionator may be employed to effect the desired feed fractionation. Within feed fractionator 5 there is separated a fraction of intermediate boiling range. The fraction of intermediate boiling range may comprise, for example, hydrocarbons having six atoms to the molecule, such as a hexane fraction comprising open chain hexanes, methylcyclopentane and cyclohexane. Although a hexane fraction is chosen in the present illustrative description it is to be understood that the invention is in no wise limited to the separation of a hexane fraction as a fraction of intermediate boiling range. Thus, the intermediate boiling range fraction may comprise hydrocarbons having seven carbon atoms to the molecule; a hydrocarbon mixture of wider boiling range comprising both $C_6$ and $C_7$ hydrocarbons, or a hydrocarbon mixture comprising or predominating in hydrocarbons having more than seven carbon atoms to the molecule.

The hexane fraction is passed from fractionator 5 through line 6 into an extractive distillation zone. The extractive distillation zone may comprise a fractionating column 7. A valved line 4 is provided for the introduction of hydrocarbon charge directly into line 6. The hydrocarbons so introduced by means of line 4, may constitute a part or all of the hydrocarbon charge to column 7.

Within column 7 the hydrocarbon mixture charged thereto through line 6 is subjected to fractional distillation with the aid of suitable heating means comprising heater 9, closed heating coil 10 and controlled introduction of reflux into the upper part of the column.

A preformed organo-metal halide complex is introduced into the top of fractionating column 7 by means of valved line 12. The fluid organo-metal halide complex is prepared by mixing a metal halide of the Friedel-Crafts type, for example, a halide of aluminum such as aluminum chloride and/or aluminum bromide with an organic compound under suitable conditions resulting in the interaction of the metal halide with the organic compound and/or decomposition products thereof. Suitable organic compounds with which the metal halide may be combined under conditions resulting in the obtaining of a desired organo-metal halide complex comprising, for example, aromatic hydrocarbons such as benzene, toluene; hydrocarbon fractions such as an aromatic kerosene extract; cyclic olefins such as cyclohexene, cyclopentene, and alkyl derivatives thereof; paraffinic and olefinic hydrocarbons of straight or branched chain structure; phenols; organic acids; ethers, etc. Of the suitable organo-metal halide complexes, those comprising the aluminum chloride-hydrocarbon complex are somewhat preferred.

The rate of introduction of the organo-metal halide complex into the column may vary considerably within the scope of the invention. The ratio of solvent introduced into the column to hydrocarbon is, however, maintained sufficiently high to maintain a homogeneous liquid phase in equilibrium with the vapors at all times. Ratios of organo-metal halide solvent to hydrocarbon feed of from about 4:1 to about 30:1 have been found satisfactory. Higher or lower ratios of solvent to hydrocarbon may, however, be employed within the scope of the invention. Paraffinic hydrocarbon reflux is introduced into the upper part of the column, preferably above the point of introduction of the organo-metal halide solvent by means of line 13. Conditions of temperature maintained within column 7 will, of course, vary in accordance with the nature of the hydrocarbon mixture introduced therein. Conditions within the column are, however, at all times carefully controlled to effect the separation of a vapor fraction consisting predominantly of paraffinic hydrocarbons from a liquid fraction consisting predominantly of organo-metal halide complex and cycloparaffins.

Liquid bottoms comprising the organo-aluminum chloride complex and cycloparaffins are passed from the lower part of column 7 through valved line 15 and heat exchanging means 16 into a complex separating zone. The complex separating zone may comprise a still 17. Within still 17 the hydrocarbons comprising cycloparaffins are distilled from the organo-metal halide complex. Vapors comprising methylcyclopentane and cyclohexane are passed from still 17 through line 18 and cooler 19 into an accumulator 20. The cycloparaffins may be removed from accumulator 20 through valved line 21 as a final product. A part of the cycloparaffins is, however, preferably passed through lines 23, 24 and 25 into a fractionator 26. Within fractionator 26 a vapor fraction comprising methylcyclopentane is separated from a liquid fraction comprising clycohexane. The liquid fraction is eliminated from fractionator 26 through valved line 28 as a final product. The vapor fraction is eliminated from fractionator 26 through valved line 29.

The vapor overhead from extractive distillation column 7 comprising open chain hexanes is passed through line 31 and cooler 32 into an accumulator 33. A portion of the paraffinic condensate is passed from accumulator 33 through lines 34 and 13 as reflux into the upper part of fractionator 7.

Although the separation of the organo-metal halide solvent from cycloparaffins is accomplished by distillation in the above illustrative description of the invention, other means of effecting such separation may be resorted to. The complex may be separated from cycloparaffins by scrubbing the mixture with a suitable hydrocarbon such as, for example, a low boiling saturated hydrocarbon, such as butane or pentane, as disclosed in copending application, Serial No. 538,893, filed June 6, 1944, now Patent 2,382,445.

A particular advantage of the invention resides in the ability to recover the naphthenic hydrocarbons of non-hydroaromatic structure, originally present in the charge, in the form of naphthenic hydrocarbons of hydroaromatic structure. Thus, in the treatment of a naphthenic hexane fraction containing methylcyclopentane, maintenance of suitable cycloparaffin isomerizing conditions within column 7 enables the conversion of methylcyclopentane to cyclohexane during the extractive distillation operation. To attain these objectives a hydrogen halide promoter such as, for example, hydrogen chloride, or a material affording the hydrogen halide under the conditions maintained in column 7, is introduced into the lower part of the column through valved line 35 at a point below the introduction of the charge. A part of the hydrogen chloride may be introduced directly into line 6 from line 36. The hydrogen chloride promoter is introduced at such a rate as to maintain a concentration of the hydrogen halide in the column in the range of from about 0.1 to about 2.0 and preferably from about 0.1 to about 0.5 per cent by weight of the hydrocarbon in the column.

When thus maintaining cycloparaffin isomerizing conditions within column 7, the vapor overhead passing from extractive distillation column 7 through line 31 will contain hydrogen chloride. The hydrocarbons comprising hydrogen chloride within accumulator 33 are forced through line 37 into a stripping column 38. The hydrogen chloride thus separated in column 38 is passed therefrom through lines 41, 36 and 35 into column 7. Make-up hydrogen chloride is introduced into the system by means of valved line 42. Paraffinic hydrocarbons comprising open chain hexanes are eliminated from the lower part of stripping column 38, through valved line 44, as a final product.

Bottoms from extractive distillation column 7 will generally be free of any substantial amount of hydrogen chloride. When, however, hydrogen chloride is present in the hydrocarbons in accumulator 20, because, for example, of separate hydrogen chloride introduction into still 17 as described more fully below, the hydrocarbons containing hydrogen chloride are passed from accumulator 20 through lines 23 and 39 into a separate stripping column 40. Overhead containing hydrogen chloride is recycled from stripping column 40, through lines 36 and 35, to extractive distillation column 7. Cycloparaffins comprising cyclohexane and unconverted methylcyclopentane are passed from stripping column 40 through valved line 25, into fractionator 26.

Overhead comprising unconverted methylcyclopentane, eliminated from column 26 through line 29, is recycled at least in part to extractive distillation column 7, by means of lines 43 and 6, or is subjected to the extractive distillation in accordance with the invention in a separate extractive distillation zone not shown in the drawing.

Separation of cycloparaffins from the metalhalide hydrocarbon complex solvent, it has been found, is facilitated by effecting such separation within still 7 in the presence of additionally introduced hydrogen halide. A valved line 45 is therefore provided to enable the passage of hydrogen chloride from line 36 into line 15 carrying liquid bottoms from extractive distillation column 7 into still 17. In a further modification of the invention hydrogen halide, for example, hydrogen chloride, is introduced into still 17 through line 45, but no hydrogen halide is introduced into extractive distillation column 7. Column 7 will then function as described above to effect the separation of cycloparaffins from paraffins in the absence of any substantial cycloparaffin isomerization, whereas in still 17 isomerization of cycloparaffins, for example, conversion of cycloparaffins of non-hydroaromatic structure to cycloparaffins of hydroaromatic structure will take place. Under these conditions still 17 will function as a cycloparaffin isomerizing zone.

Organo-aluminum chloride complex, substantially free of cycloparaffins, is eliminated from still 17 through valved line 46 and introduced into line 12, passing into the top of column 7. The temperature of the recycled complex is adjusted by suitable means so that it is introduced into column 7 at a temperature substantially equal to the temperature in column 7 at the point of its introduction.

Hydrocarbon mixtures comprising naphthenic hydrocarbons often contain, in addition to open chain paraffins, a certain amount of aromatic hydrocarbons. Thus, the naphthenic hexane and/or heptane fractions will generally comprise a certain amount of benzene and/or toluene. This material may be removed from the charge by suitable pretreatments prior to introduction into column 7. The organo-aluminum chloride complex, it has been found, however, is far more selective as a solvent for aromatic hydrocarbons than for cycloparaffins. Distillation within still 17 of the liquid bottoms emanating from column 7 under conditions effecting the separation of cycloparaffins from the complex will generally result in a retention in the complex of at least a substantial amount of the aromatics originally present in the charge. In a modification of the invention, when the charge to the system comprises aromatic hydrocarbons, at least a part of the complex eliminated from still 17 is passed through line 48, containing heat exchanging means 49, into a third distillation zone comprising, for example, still 50. Within still 50 the complex, substantially free of cycloparaffins but still containing aromatic hydrocarbons, which in the treatment of naphthenic hexane fractions will comprise benzene, is subjected to more drastic distillation conditions to effect the separation of substantially all of the benzene. The more drastic conditions may be obtained by distillation at a higher temperature by means of heat input into heating means 49 and closed heating coil 51, by prolonged residence time in still 50, by use of subatmospheric pressure, by the introduction of stripping gases such as hydrogen, methane, ethane, nitrogen, etc., through valved line 52, or hydrogen chloride through line 53, or by any two or more of these expedients. Vapors comprising benzene are eliminated from still 50 through valved line 54. Organo-aluminum chloride complex, now free of any substantial amount of benzene, is taken from still 50 through valved line 55, and is recycled at least in part through lines 56, 46 and 12 into the upper part of fractional distillation column 7.

The following examples are illustrative of the isomerization of cycloparaffins with simultaneous separation of cycloparaffins from admixtures with open chain paraffins in accordance with the process of the invention.

*Example*

In a series of separate operations, portions of a full range hexane fraction, obtained by fractional distillation of napthenic straight run gasoline, and having the following composition:

Naphthenes: Per cent by volume
  Methylcyclopentane -------------------- 33
  Cyclohexane ------------------------- 21
Paraffins:
  Methylpentanes ---------------------- 1
  Normal hexane----------------------- 34
  Dimethylpentanes -------------------- 4
  Benzene ---------------------------- 7 were subjected to extractive distillation under isomerizing conditions in a 40 bubble plate fractionating column. Into the upper part of the column there was introduced a preformed hydrocarbon-aluminum chloride complex prepared from equal parts of aluminum chloride and a kerosene extract having a boiling range of from 150° C. to 200° C. Hydrogen chloride was introduced in continuous stream into the lower part of the extraction distillation column. Bottoms from the extractive distillation column were passed into a stripping column wherein separation of extracted hydrocarbons from complex was accomplished. Complex taken from the bottom of the stripping column was recycled to the upper part of the extractive distillation column. The recycle stream temperature was adjusted to that within the fractional distillation column at the point of its introduction. Conditions of operation as well as results obtained are indicated in the following table:

|  | Run No. | | |
| --- | --- | --- | --- |
|  | 1 | 2 | 3 |
| Extractive distillation column: | | | |
| Plates above complex introduction | 6 | 6 | 6 |
| Plates above feed introduction | 28 | 28 | 19 |
| Volume ratio of AlCl₃-complex charged to hydrocarbon feed | 5.9 | 5.8 | 8.1 |
| Volume percent AlCl₃-complex in column | 92 | 74.0 | ---- |
| Reflux ratio at stillhead | 1 | 5 | 5 |
| HCl introduced—weight percent of hydrocarbon feed | 0.5 | 0.5 | 0.5 |
| Temperature of stripping column, ° C | 130 | 133 | 130 |
| Results: | | | |
| Volume percent of naphthenes in stripper overhead | 79 | 73 | 73 |
| Percent of paraffins in feed rejected overhead in extractive distillation column | 71 | 66 | 90 |
| Percent of dimethylpentanes in feed rejected overhead in extractive distillation column | 45 | 30 | 50 |
| Cyclohexane to methylcyclopentane, ratio in extractive distillation column bottoms, percent of equilibrium | 82 | 65 | 100 |

It is seen from the foregoing example that substantial separation of even dimethylpentanes from methylcyclopentane and cyclohexane is effected in the process of the invention. In the distillation of a separate portion of the same full hexane fraction utilized as charge in the above example under substantially identical conditions but in the absence of the hydrocarbon-aluminum chloride complex solvent, it was found that all of the dimethylpentane content of the feed was contained in the bottoms of the distillation column.

We claim as our invention:

1. The process for the separation of cycloparaffins comprising methylcyclopentane from a hydrocarbon mixture containing said cycloparaffins in admixture with open chain paraffins having substantially the same boiling range with simultaneous conversion of methylcyclopentane to cyclohexane during said separation which comprises subjecting said hydrocarbon mixture to fractional distillation in a fractionating zone, introducing a preformed aluminum chloride-hydrocarbon complex into the upper part of the fractionating zone, introducing hydrogen chloride into a lower part of the fractionating zone, thereby simultaneously converting methylcyclopentane to cyclohexane and forming a vapor fraction predominating in paraffins and a liquid fraction predominating in aluminum chloride-hydrocarbon complex and cycloparaffins comprising cyclohexane, separately removing said vapor and liquid fractions from the fractionating zone, and separating cycloparaffins comprising cyclohexane from said liquid fraction.

2. The process for the separation of cycloparaffins comprising methylcyclopentane from a hydrocarbon mixture containing said cycloparaffins in admixture with open chain paraffins having substantially the same boiling range with simultaneous conversion of methylcyclopentane to cyclohexane during said separation which comprises subjecting said hydrocarbon mixture to fractional distillation in a fractionating zone, introducing a preformed aluminum halide-hydrocarbon complex into the upper part of the fractionating zone, introducing hydrogen halide into a lower part of the fractionating zone, thereby simultaneously converting methylcyclopentane to cyclohexane and forming a vapor fraction predominating in paraffins and a liquid fraction predominating in aluminum halide-hydrocarbon complex and cycloparaffins comprising cyclohexane, separately removing said vapor and liquid fractions from the fractionating zone and separating cycloparaffins comprising cyclohexane from said liquid fraction.

3. The process for the separation of cycloparaffins comprising cycloparaffins of non-hydroaromatic structure from a hydrocarbon mixture containing said cycloparaffins in admixture with open chain paraffins having substantially the same boiling range with simultaneous conversion of cycloparaffins of non-hydroaromatic structure to cycloparaffins of hydroaromatic structure during said separation which comprises subjecting said hydrocarbon mixture to a fractional distillation in a fractionating zone, introducing a preformed aluminum halide-hydrocarbon complex into the upper part of the fractionating zone, introducing a hydrogen halide into a lower part of the fractionating zone, thereby converting cycloparaffins of non-hydroaromatic structure to cycloparaffins of hydroaromatic structure while forming a vapor fraction predominating in paraffins and a liquid fraction predominating in aluminum halide-hydrocarbon complex in admixture with cycloparaffins comprising cycloparaffins of hydroaromatic structure, separately removing said vapor and liquid fractions from the fractionating zone, and separating cycloparaffins comprising cycloparaffins of hydroaromatic structure from said liquid fraction.

4. The process for the separation of cycloparaffins comprising cycloparaffins of non-hydroaromatic structure from a hydrocarbon mixture containing said cycloparaffins in admixture with open chain paraffins having substantially the same boiling range with simultaneous conversion of cycloparaffins of non-hydroaromatic structure to cycloparaffins of hydroaromatic structure during said separation which comprises subjecting said hydrocarbon mixture to a fractional distillation in a fractionating zone, introducing a preformed aluminum halide-containing complex interaction product obtained by the interaction of an aluminum halide with an organic compound into the upper part of the fractionating zone, introducing a hydrogen halide into a lower part of the fractionating zone, thereby converting cycloparaffins of non-hydroaromatic structure to cycloparaffins of hydroaromatic structure while forming a vapor fraction predominating in paraffins and a liquid fraction predominating in organo-aluminum halide complex in admixture with cycloparaffins comprising cycloparaffins of hydroaromatic structure, separately removing said vapor and liquid fractions from the fractionating zone, and separating cycloparaffins comprising cycloparaffins of hydroaromatic structure from said liquid fraction.

5. The process for the separation of cycloparaffins comprising cycloparaffins of non-hydroaromatic structure from a hydrocarbon mixture containing said cycloparaffins in admixture with open chain paraffins having substantially the same boiling range with simultaneous conversion of cycloparaffins of non-hydroaromatic structure to cycloparaffins of hydroaromatic structure during said separation which comprises subjecting said hydrocarbon mixture to a fractional distillation in a fractionating zone, introducing a preformed metal halide-containing complex interaction product obtained by the interaction of a metal halide of the Friedel-Crafts type and an organic compound into the upper part of the fractionating zone, introducing a hydrogen halide into a lower part of the fractionating zone, thereby converting cycloparaffins of non-hydroaromatic structure to cycloparaffins of hydroaromatic structure while forming a vapor fraction predominating in paraffins and a liquid fraction predominating in said metal halide-containing complex in admixture with cycloparaffins comprising cycloparaffins of hydroaromatic structure, separately removing said vapor and liquid fractions from the fractionating zone, and separating cycloparaffins comprising cycloparaffins of hydroaromatic structure from said liquid fraction.

6. The process for the production of cyclohexane from a hydrocarbon mixture containing cycloparaffins comprising methylcyclopentane and open chain paraffins having substantially the same boiling range which comprises subjecting said hydrocarbon mixture to fractional distillation in the presence of a preformed aluminum chloride-hydrocarbon complex and hydrogen chloride, thereby simultaneously converting methylcyclopentane to cyclohexane and forming a vapor fraction comprising paraffins and a liquid fraction comprising aluminum chloride-hydrocarbon complex in admixture with cycloparaffins containing cyclohexane, and separating cycloparaffins comprising cyclohexane from said liquid fraction.

7. The process for the production of cycloparaffins of hydroaromatic structure from a hydrocarbon mixture containing cycloparaffins comprising cycloparaffins of non-hydroaromatic structure and open chain paraffins having substantially the same boiling range which comprises subjecting said hydrocarbon mixture to fractional distillation in the presence of a preformed aluminum halide-hydrocarbon complex and hydrogen halide, thereby simultaneously converting cycloparaffins of non-hydroaromatic structure to cycloparaffins of hydroaromatic structure and forming a vapor fraction comprising paraffins and a liquid fraction comprising aluminum halide-hydrocarbon complex and cycloparaffins of hydroaromatic structure, and separating cycloparaffins of hydroaromatic structure from said liquid fraction.

8. The process for the production of cycloparaffins of hydroaromatic structure from a hydrocarbon mixture containing cycloparaffins comprising cycloparaffins of non-hydroaromatic structure and open chain paraffins having substantially the same boiling range which comprises subjecting said hydrocarbon mixture to fractional distillation in the presence of a hydrogen halide and a preformed metal halide-containing complex interaction product obtained by the interaction of a metal halide of the Friedel-Crafts type and an organic compound, thereby simultaneously converting cycloparaffins of non-hydroaromatic structure to cycloparaffins of hydroaromatic structure and forming a vapor fraction comprising paraffins and a liquid fraction comprising said metal halide-containing complex and cycloparaffins of hydroaromatic structure, and separating cycloparaffins of hydroaromatic structure from said liquid fraction.

9. The process for separating cycloparaffins comprising cycloparaffins of non-hydroaromatic structure from a hydrocarbon mixture containing said cycloparaffins in admixture with open chain paraffins having substantially the same boiling range with simultaneous conversion of cycloparaffins of non-hydroaromatic structure to cycloparaffins of hydroaromatic structure which comprises subjecting said hydrocarbon mixture to fractional distillation in a fractional distillation zone, introducing a preformed metal halide-containing complex interaction product obtained by the interaction of a metal halide of the Friedel-Crafts type and an organic compound into the upper part of the fractional distillation zone, introducing a hydrogen halide into a lower part of the fractional distillation zone, thereby simultaneously converting cycloparaffins of non-hydroaromatic structure to cycloparaffins of hydroaromatic structure and forming a vapor fraction predominating in paraffins in admixture with hydrogen halide and a liquid fraction predominating in said metal halide-containing complex in admixture with cycloparaffins comprising cycloparaffins of hydroaromatic structure, separately removing said vapor and liquid fractions from the fractionating zone, separating cycloparaffins comprising cycloparaffins of hydroaromatic structure from said liquid fraction, passing said vapor fraction from said fractionating zone to a stripping zone, separating a gaseous fraction comprising hydrogen halide in said stripping zone, and passing said gaseous fraction from said stripping zone to the fractionating zone.

10. The process for the separation of cycloparaffins from a hydrocarbon mixture comprising an isomerizable cycloparaffin having at least six carbon atoms to the molecule and containing at least five carbon atoms in the ring in admixture with open chain paraffins having substantially the same boiling range while simultaneously isomerizing said cycloparaffin, which comprises subjecting said hydrocarbon mixture to extractive distillation in the presence of a hydrogen halide and a preformed metal halide-containing complex interaction product obtained by the interaction of a metal halide of the Friedel-Crafts type and an organic compound, thereby isomerizing said cycloparaffin to a cycloparaffin of different molecular structure having the same number of carbon atoms to the molecule and containing at least five carbon atoms in the ring while simultaneously forming a vapor fraction comprising paraffins and a liquid fraction comprising said metal halide-containing complex in admixture with said isomerized cycloparaffin, and separating cycloparaffins comprising said isomerized cycloparaffin from said liquid fraction.

WILLIAM E. ROSS.
PHILIP PEZZAGLIA.